Patented May 6, 1930

1,757,118

UNITED STATES PATENT OFFICE

FRANK E. HARRIS, OF BELLINGHAM, WASHINGTON

SOLDERING FLUX

No Drawing.   Application filed March 2, 1929. Serial No. 343,892.

My invention relates to soldering fluxes, and the object of my invention is to provide a soldering flux which may be used along with ordinary commercial solder for soldering aluminum and other metals that have heretofore been difficult or substantially impossible to solder and which may further be used in soldering substantially all metals that are now soldered by the use of ordinary soldering flux.

It has heretofore been substantially impossible to make ordinary lead and tin solder adhere to certain metals and alloys, the most important of which is aluminum and its alloys. Many attempts have been made to find a flux or to devise a practical method of soldering aluminum with ordinary commercial solder, but, so far as I am aware, none of these attempts have been successful and the only way that aluminum can be soldered at the present time is by the use of a specially prepared aluminum solder made from different ingredients from ordinary solder and requiring different handling.

In accordance with my invention I provide a simple and efficient flux which makes it possible to cause ordinary commercial solder to adhere with great tenacity to aluminum when applied with a soldering iron in the usual manner.

This flux is composed of a mixture of zinc stearate in either a powdered or lump form which is made into a liquid or paste by mixing it with an oil and with a light petroleum derivative. In my preferred formula I take commercial zinc stearate Merck, and olive oil, and either benzol or benzine to which sufficient carbon tetrachloride has been added to render the same non-inflammable and mix the zinc stearate Merck with the olive oil and the light petroleum derivative to form a soft paste or a liquid that may be poured freely. This paste or liquid is placed on the metal which is to be soldered, in the same manner as ordinary flux and the moulten solder is applied, preferably with a clean, hot copper iron. When thus applied, I find that ordinary lead and tin solder will adhere with great tenacity to aluminum and that the solder will break to pieces before it will separate from the aluminum. This flux may also be successfully used for soldering pewter, galvanized iron, tin, brass, copper, and various other metals and alloys of the same.

The zinc stearate which I prefer to use is that which sells under the trade name of zinc stearate Merck although I find that other brands of zinc stearate may be used. Other oils may be substituted for olive oil and any light petroleum product in the nature of benzol may be used. When carbon terachloride is added the flux is inflammable. When made with benzol only it will burn. The relative amounts of the several ingredients may vary considerably so long as enough of the olive oil and light petroleum derivative are used with the zinc stearate to make a paste or liquid.

The foregoing description clearly discloses a preferred embodiment of my invention, but it will be understood that changes in the composition of my flux may be made within the scope and spirit of the following claims.

I claim:

1. A soldering flux embodying zinc stearate mixed with an oil and a light petroleum derivative.

2. A flux for soldering aluminum and other metals, embodying zinc stearate, olive oil, and a light petroleum derivative.

3. A soldering flux in the form of a liquid or paste, embodying zinc stearate, an oil and benzol.

4. A flux for soldering aluminum and other metals, including zinc stearate, an oil, and benzine and carbon tetrachloride.

5. A flux for soldering aluminum embodying a mixture of zinc stearate Merck, olive oil, and benzol.

The foregoing specification signed at Bellingham, Wash., this 18th day of Feb., 1929.

FRANK E. HARRIS.